Feb. 26, 1963  J. A. MacLEAN III, ET AL  3,078,899
FASTENERS HAVING TOOTHED BEARING SURFACES
Filed May 22, 1959  3 Sheets-Sheet 1
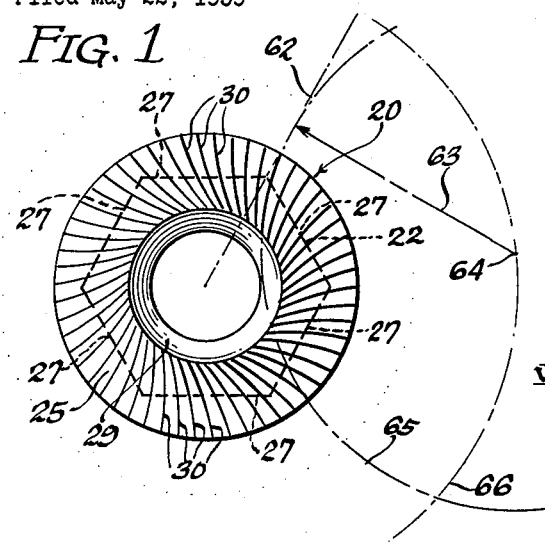
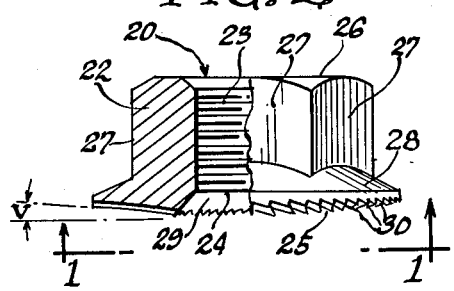
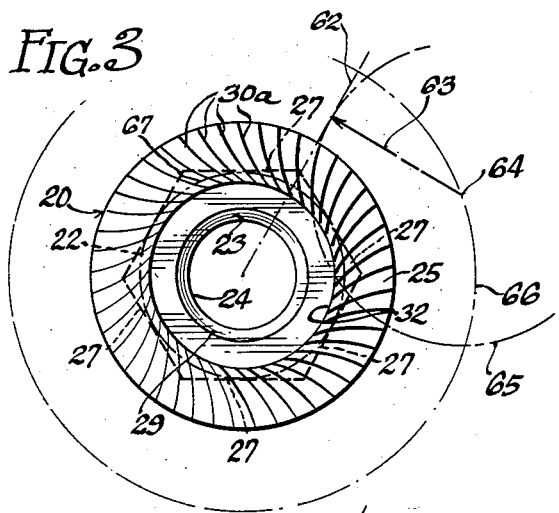
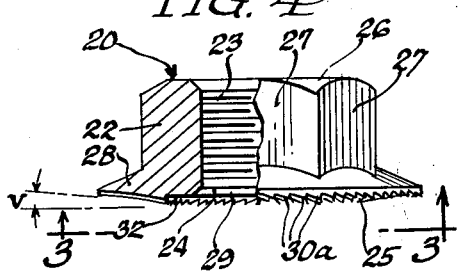
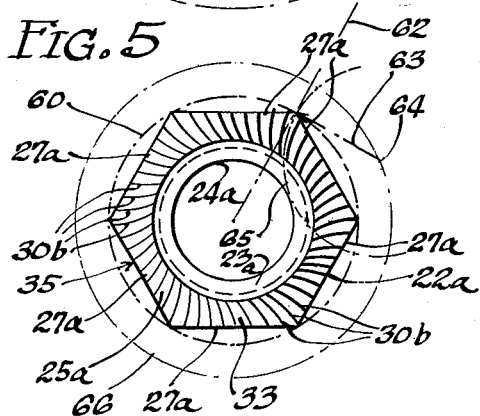
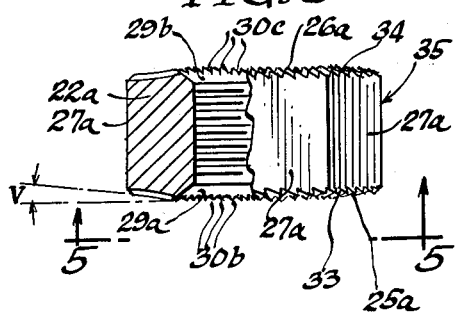
INVENTORS
John A. MacLean III
BY Eugene F. Kuffel
Horton, Davis,
Brewer & Brugman
Attorneys

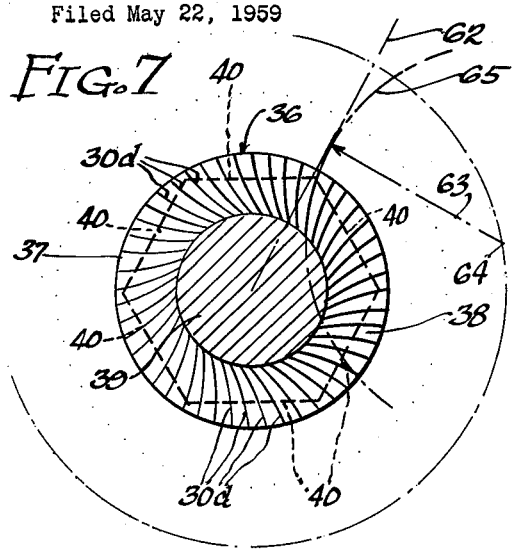
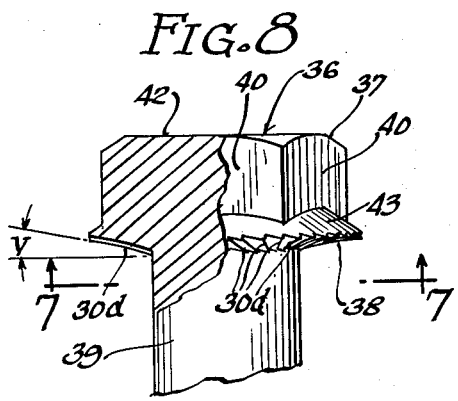
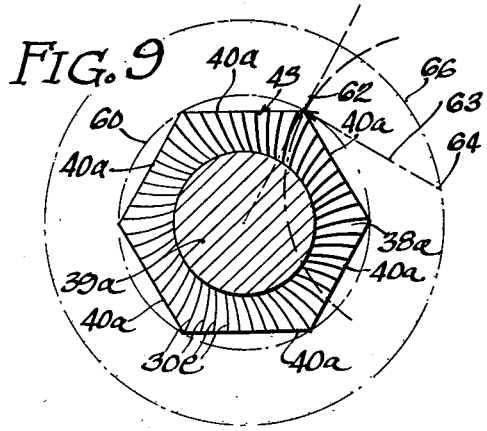
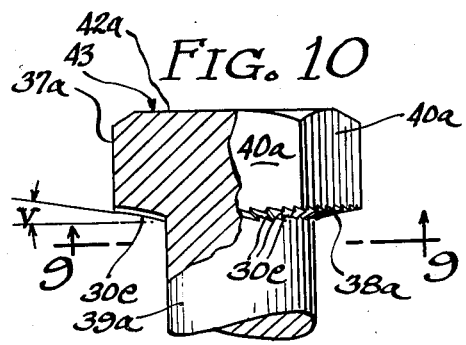
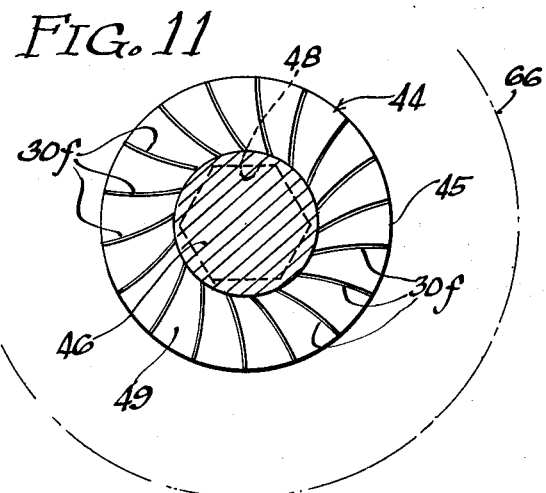
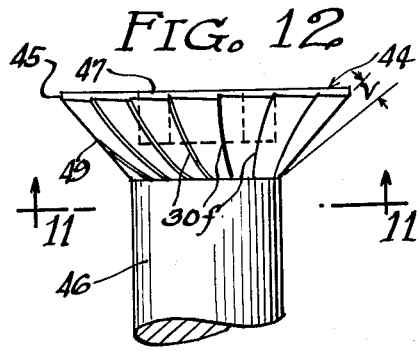

Feb. 26, 1963   J. A. MacLEAN III, ET AL   3,078,899
FASTENERS HAVING TOOTHED BEARING SURFACES
Filed May 22, 1959   3 Sheets-Sheet 3

INVENTORS
John A. MacLean III
BY Eugene F. Kuffel
Horton Davis
Brewer & Brugman
Attorneys United States Patent Office 3,078,899
Patented Feb. 26, 1963

3,078,899
FASTENERS HAVING TOOTHED BEARING SURFACES
John A. MacLean III, Northbrook, Ill., and Eugene F. Kuffel, Chicago, Ill. (both % MacLean Fogg Lock Nut Co., 5535 N. Wolcott Ave., Chicago 40, Ill.)
Filed May 22, 1959, Ser. No. 815,218
3 Claims. (Cl. 151—37)

This invention relates to fasteners having toothed bearing surfaces and more particularly to fasteners including bolts, nuts, screws and the like having bearing surfaces providing with teeth constructed and arranged to afford material resistance to loosening of the fasteners after being brought into pressure engagement with a coacting surface by the tightening of the fastener.

One of the objects of the invention is to provide an integrally formed fastener having a bearing surface which has teeth thereon engageable with an opposed structural surface and characterized to effect the requirement of a release torque value for loosening the fastener which considerably exceeds the application torque required for tightening it.

Another object of this invention is to provide an integrally formed threaded fastener provided with a toothed bearing surface affording a high ratio of the holding or gripping tension in the fastener to the application torque required for tightening the fastener to the extent required for producing the tension, as well as producing a locking action by increasing the release torque to a value above the application torque.

As another object, it is within the purview of this invention to provide a unitary and integrally formed threaded fastener providing higher release torque to application torque ratio characteristics and better bolt tension characteristics than generally known and commercially accepted lock washers and free spinning lock nuts used with fasteners of like sizes.

This invention also comprehends the provision of integral teeth of the type to which reference has been made and which are readily applicable to one or both end surfaces of a double ended nut.

It is another object of this invention to provide an integrally formed threaded fastener having teeth on a bearing face thereof, which teeth are shaped and disposed to eject chips outwardly from the center or axis of the fastener after being tightened and when the fastener is turned to be loosened.

As another object, this invention has within its purview the provision of a threaded fastener having a toothed bearing surface which is contoured to bear against an opposing surface from a region near the center or axis toward the periphery thereof as the fastener is tightened.

This invention comprehends for a further object the provision of threaded fasteners having toothed bearing surfaces wherein the teeth are of substantially uniform depth, so as to distribute the back-off release stresses along the tooth edges.

Other objects and advantages of the invention will be apparent from the following description and the accompanying drawings in which similar characters of reference indicate similar parts throughout the several views.

FIGS. 1 and 2 are respectively end and side elevational views showing the adaptation of a preferred embodiment of our invention to a flanged nut; the end view of FIG. 1 being taken substantially as indicated by a line 1—1 and accompanying arrows in FIG. 2, and FIG. 2 having a portion of the nut broken away to illustrate details of the structure;

FIGS. 3 and 4 are views similar to FIGS. 1 and 2, with the end view of FIG. 3 being taken substantially as indicated by a line 3—3 and accompanying arrows in FIG. 4, and the illustrated embodiment incorporating a modification of the structure depicted in FIGS. 1 and 2;

FIGS. 5 and 6 are respectively end and side elevational views showing the adaptation of this invention to both ends of a standard hexagonal nut, the end elevational view of FIG. 5 being taken substantially as indicated by a line 5—5 and accompanying arrows in FIG. 6 and FIG. 5 showing a portion of the nut broken away to illustrate details;

FIGS. 7 and 8 are end sectional and fragmentary side elevational views of a bolt having a flanged head and illustrating the adaptation of our invention thereto, with the section for FIG. 7 taken substantially on a line 7—7 and in the direction of the arrows as shown in FIG. 8, and FIG. 8 showing a portion of the bolt structure broken away;

Figure 13:
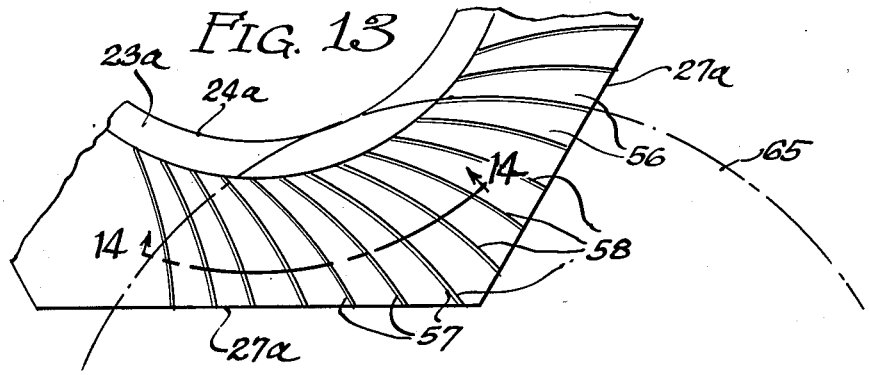
Figure 14:
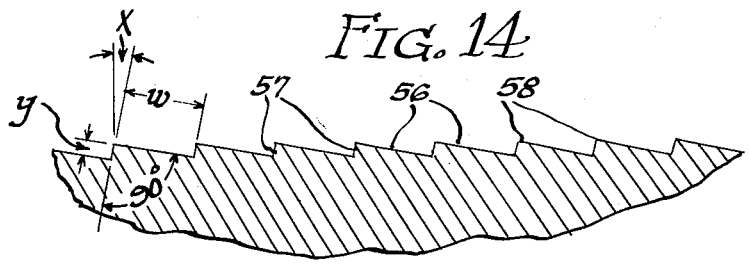
Figure 15:
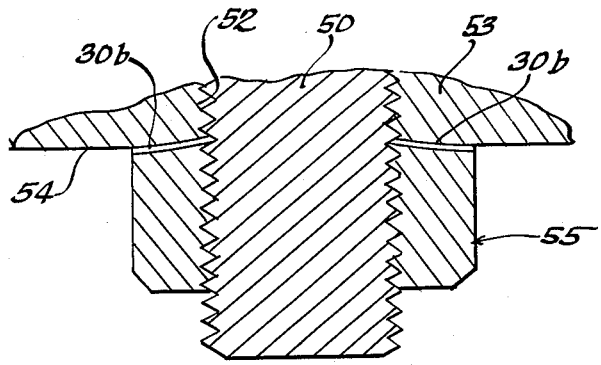

FIGS. 9 and 10 are views similar to FIGS. 7 and 8 respectively, wherein the section for FIG. 9 is taken substantially as indicated by a line 9—9 and accompanying arrows in FIG. 10, these latter figures depicting the adaptation of our invention to a bolt having a hexagonal head;

FIGS. 11 and 12 are respectively end sectional and fragmentary side elevational views showing the adaptation of our invention to a screw, the sectional view of FIG. 11 being taken substantially as indicated by a line 11—11 and accompanying arrows in FIG. 12;

FIG. 13 is a fragmentary end elevational view drawn to a larger scale than FIG. 5, better to illustrate details of the structure, and showing the adaptation of our invention to a hexagonal type of nut;

FIG. 14 is a developed fragmentary side sectional view taken substantially as indicated by a line 14—14 and accompanying arrows in FIG. 13; and FIG. 15 is a fragmentary side sectional view depicting the application of a hexagonal nut of the type shown in FIG. 5 to a bolt and having its toothed bearing surface tightened against an opposed surface of a part through which the bolt extends.

In considering fasteners of the types herein disclosed, it may be understood that the toothed surfaces of the fasteners are intended to be harder than the surfaces against which they have pressure contact.

In the illustrated embodiments of our invention which are disclosed in the accompanying drawings for illustrative purposes, we have shown the adaptation of our invention to various types of fasteners. That is, FIGS. 1, 2, 3 and 4 depict flanged nuts 20 wherein a body portion 22 is axially bored and threaded to provide threads 23 encompassing a central opening 24 which extends between end surfaces 25 and 26 of the body portion. Flat side surfaces 27 are provided in opposed pairs on the outside of the body portion for receiving a torque applying tool, such as a wrench, for tightening and loosening the fastener. Adjacent the end surface 25 of the body portion 22, a flange 28 projects outwardly in a radial direction beyond the flat side surfaces 27 and their corners of intersection, so that the end surface 25 is larger than the end surface 26 and provides a bearing surface of larger area than that of a conventional type of square or hexagonal nut. In the form disclosed, the periphery of the flange 28 is substantially circular.

As is customary, to facilitate the application of the nut, a circular bevelled edge 29 is provided between the end bearing surface 25 and the threads 23 in the opening 24. Teeth 30, which will be more fully described, are provided on the end bearing surface 25 and project axially therefrom. In the nut type fastener disclosed in FIGS. 1 and 2, the teeth 30 extend from the bevelled edge 29 to the periphery of the end bearing surface 25 which extends to the outer edge of the flange 28. However, in the modified fastener illustrated in FIGS. 3 and 4, an annular recess 32 is provided in the end bearing surface 25 between the bevelled edge 29 adjacent the opening and the end bearing surface 25, so that teeth 30a extend from the outer edge of the recess 32 to the outer periphery of the end bearing surface 25.

FIGS. 5 and 6 illustrate the application of teeth 30b and 30c to opposed end bearing surfaces 33 and 34 of a relatively conventional type of a double ended hexagonal nut 35. It may be understood that the teeth of this invention are similarly applicable to various shapes of nuts, such as the square and hexagonal varieties, and that the teeth may be utilized, if desired, on both ends of nuts which are made for application from either end to facilitate their application in instances in which orienting or reversal of the nuts would hamper production. Except for the problem of orientation of such nuts before application, one toothed surface is ordinarily sufficient, and the nuts may be produced with the teeth on either one or both of the ends.

Considered generally, the illustrated double ended nut 35 has threads 23a encompassing a central axial bore 24a and extending between bevelled edges 29a and 29b at opposite ends of the nut body 22a. Flat side surfaces 27a are provided in opposed pairs on the exterior of the body portion 22a of the nut. The teeth 30b and 30c on the opposite ends of the nut body extend from the outer peripheries of the bevelled edges 29a and 29b substantially to the flat side surfaces 27a which define the periphery of the nut body.

FIGS. 7 and 8 illustrate a threaded fastener in the form of a bolt 36 having a flange-type head 37 which may be considered to be the body of the fastener through which torque is applied and which provides an end bearing surface portion 38 which bears against a surface of a structure to which the bolt is applied for fastening purposes. The bolt 36 also has a stem or shank portion 39 on one end of which the head 37 is formed, and which is threaded along a suitable portion of its periphery. The head 37 of the bolt 36 has opposed pairs of flat side surfaces 40 for the application of a torque applying tool, such as a wrench, thereto and has a generally flat end surface 42. In the bolt of FIGS. 7 and 8, a flange 43 projects radially from the head 37 adjacent the stem or shank portion 39 and adjoins the flat side surfaces 40 to enlarge the diameter and area of the end bearing surface 38. Teeth 30d project axially from the end bearing surface 38 toward and longitudinally of the stem or shank portion 39.

In FIGS. 9 and 10, a bolt 43 of a relatively conventional hexagonal-head type has a head 37a and an integral stem or shank 39a, which stem or shank is threaded for a desired portion of its length. The head 37a has a generally flat end surface 42a and has an end bearing surface 38a adjacent to and extending radially from the stem or shank portion 39a. As in the case of nuts, the head 37a may have different numbers of flat side surfaces, such as 40a, and usually such side surfaces are disposed in opposed pairs for receiving a torque applying tool. The bolt of FIGS. 9 and 10 has teeth 30e on the end bearing surface 38a, which teeth project axially and longitudinally of the stem or shank of the bolt and extend from the stem or shank to the surfaces 40a which define the periphery of the head.

The fastener of FIGS. 11 and 12 is a screw 44 having, in the form disclosed, a circular head 45 and a stem or shank 46 integral with and extending axially from the head. In the form illustrated, the head 45 has a flat end surface 47 provided with a recess 48 for receiving a torque applying tool. A bevelled bearing surface 49 is provided on the head 45 and extends from the stem or shank 46 to the periphery of the head. As may be understood, the stem or shank may be provided with any of a variety of types of threads suited to different purposes. In this instance, teeth 30f are provided on the bevelled bearing surface 49 and project axially and longitudinally of the stem or shank.

Having thus generally described various illustrative and exemplary types of fasteners to which our invention is applicable, the features of the structure embodied in the invention and the application thereof to the various types of fasteners will be considered in greater detail. From the foregoing description it may have been observed that each of the generally described threaded fasteners has an end bearing surface which is adapted to engagement with a surface of some structure against which the fastener coacts when it is tightened. In each instance also, that end bearing surface is provided with teeth which project axially of the fastener and are provided for the purpose of affording a locking action when the fastener is tightened. Locking action makes the torque required for the release of the fastener materially and considerably greater than the torque required for tightening the fastener. In addition to the feature of providing the aforementioned locking action, our invention affords a structure which is adapted to provide a high value bolt tension or holding force in comparison to the torque required for tightening the fastener to the extent necessary to obtain that bolt tension or holding force. Many structural considerations, including the number, shape and disposition of the teeth on the end bearing surface of the fastener, the slopes and shapes of the tooth surfaces as well as the manner of engagement of the tooth surfaces with the structure contacted thereby have important influences upon the desired results of obtaining both a high value of release torque and a high value of bolt tension or holding force as compared to a given application torque.

As used herein, the terms "bolt tension" or "holding force" refer to the tensile force developed in the shank or stem portion of a bolt when the bolt is tightened relative to another threaded element, or when a nut of one of the types herein illustrated is threaded onto a bolt and tightened. Having reference to FIG. 15, a bolt or stud 50 extends through an opening 52 in a structural element 53 having an exposed and generally flat surface 54. The nut 55, for illustrative purposes, may be one of the type illustrated in FIGS. 5 and 6, but which has teeth 30b on only one end thereof. The nut 55 is threaded onto the bolt 50 and tightened, so that the teeth 30b forcibly engage the generally flat surface 54 of the structural element 53. As the nut 55 is tightened, the torque required for effecting the tightening movement of the nut increases as the nut is tightened. At the same time, and as the nut is tightened, the tensile force developed in the bolt 50 and the holding force exerted between the toothed surface of the nut and the surface 54 of the structural element also increase. Desirably, the torque required for loosening the nut after it is tightened should materially exceed the torque required for the tightening. Also the bolt tension or holding force developed when the nut is tightened should have as high or a higher value than is usual for presently known devices which have been developed for similar purposes.

For the accomplishment of the desired results, we have developed the toothed surfaces which are depicted in adaptations to the several types of disclosed threaded fasteners, which toothed surfaces embody a combination of structural relationships and details.

In general, the teeth which are utilized on the disclosed threaded fasteners have surfaces 56 and edges 57 which intersect in substantially right angular relationship to form relatively sharp exposed corners 58 which extend nonradially across the bearing surfaces of the fasteners in directions such that when the fastener is applied and turned in the direction for tightening, the peripheral or outer end of each tooth corner leads the inner end of the tooth corner. Thus, when the fastener is turned in a direction for loosening, the outer end of each tooth corner lags behind the inner end of the tooth corner.

It may be observed that with such disposition of the tooth corners, each such tooth corner, in addition to having exerted thereagainst a circumferential force component resisting the loosening movement, will exert a radial component of force against any obstruction, such as a chip, tending to move that chip outwardly in a radial direction relative to the axis of the fastener.

As another element which is influential upon both the proportionate values of release torque and bolt tension to the application torque, the teeth have edges which approach parallelism to the fastener axis. The edges 57 of the teeth face toward the direction in which the fastener is turned for loosening, while the surfaces 56 face toward the direction in which the fastener is turned for tightening. The edges are narrow in a direction axial of the fastener and the surfaces 56 are considerably wider than the edges, so that the slope of the surfaces is gradual and the slope of the edges is abrupt in respect to the two directions of rotation of the fastener. The teeth are of uniform height and circumferential shape in order to promote evenness of engagement of the teeth with the opposed structural surface as the fastener is tightened. This tends to improve the developed bolt tension for a given application torque.

It has been found that an increase in the number of teeth beyond a predetermined number, while maintaining sufficient tooth height at the edges on a fastener of a predetermined size increases the slope angle of the surfaces in the direction for tightening the nut to an extent that the torque required to tighten the nut is materially affected, whereby the relationship of the application torque to both the bolt tension and release torque is materially and detrimentally affected. It has also been found that there are differences in the results achieved by teeth of substantially like numbers and depths in comparing teeth with straight edges to those which are curved and also as a result of the variation of the angles of the tooth edges with respect to radial planes. Thus, it may be understood that combinations of factors should be resolved for obtaining optimum results in the comparison of developed bolt tensions and release torques to values of application torques for different sizes and types of fasteners. However, it has appeared that certain basic relationships have developed in the adaptation of our invention to the various types and sizes of fasteners.

Considering the manner of tooth design in greater detail for its adaptation to various types and sizes of fasteners which are not only effective to provide the desired results in respect to affording desirable values of release torque and bolt tension in comparison to the values of application torque for tightening, as well as for providing tooth shapes which can be readily produced in production quantities, it may first be observed by reference to FIG. 14 that the angle between the surface 56 and the edge 57 of each tooth is substantially 90°. This affords a tooth profile which can be stamped onto the end of a fastener by movement of a suitable die in a direction axial to the fastener. With this established angular relationship, relatively sharp corners 58 are provided on the teeth when the angle $x$ between the surface of the edge 57 of any tooth at any point along its length varies only approximately 5° to 20° from parallelism with the axis of the fastener or a radial plane passing through the fastener axis; the angle being larger as the number of teeth is increased. These proportions also afford satisfactory relationships between the width or depth $y$ of the tooth edges 57 to the width $w$ of the surfaces 56 of the teeth, as well as providing satisfactory tooth surface slopes in both directions of location for rendering desirable values of application torque, release torque and bolt tension for the fastener.

Having thus established relationships concerned with the profile of the teeth, consideration will be given to the determination of the angle and positions of the teeth. Since the teeth cut or embed themselves into the structural surface against which they have pressure contact in use when the fastener is tightened, the corners and abruptly sloped edges, by virtue of their sharpness and angularity, offer resistance to the movement for releasing the fastener, and even have a tendency to cut chips from the pressure engaged surface during the initial releasing movement of the fastener. The non-radial disposition of the tooth edges has been found to be advantageous when the outer end of each tooth lags behind the inner end during that release movement, because the tooth edges have components which force chips radially outwardly of the fastener, as well as components which resist the releasing rotational movement of the fastener. Our curved teeth act somewhat like cups to hold metal during initial release movement and during the build-up of lock or resistance to the off turning movement, and then eject metal to keep from clogging the teeth and destroying their action. In contrast, it may be understood that radial teeth do not provide any component tending to eject chips from between the toothed surface of the fastener and the surface against which it has pressure engagement. Also, teeth which, over most of their lengths, go beyond a radial disposition with a slope opposed to that first mentioned would tend to eject chips inwardly toward the threads or stem of the fastener, rather than outwardly. If chips accumulate between the toothed fastener surface and the surface which it engages, they are extremely detrimental to any holding or locking action which the teeth may have.

Inasmuch as the teeth cross the bearing surface of the fastener, the tooth angle must afford the desired chip ejecting and holding components at all points across the surface. Tangency of a tooth edge with the inner edge of the bearing surface of a fastener would unduly limit the resistance of the tooth to rotation of the fastener in a direction for effecting its release. Also, tangency of a tooth edge with a radial line within the outer peripheral diameter of the fastener, as designated in FIG. 5, for example, by the circle 60, will provide a tooth edge or edge portion which has no component for ejecting chips outwardly in a radial direction. To provide teeth having slopes between the aforementioned limits of tangency, it may be understood that the tooth edges must cross the bearing surface and must also intersect a radial line at or beyond the major radial dimension of the fastener which is designated by the circle 60 for a fastener of polygonal section; or, in a flange type fastener, the periphery of the flange and a like radial line determine the minimum radial point at which the tooth edges must intersect a radial line.

Inasmuch as curved teeth having edge concavity facing toward the direction of rotation for release of the fastener are somewhat preferred to straight teeth having the same general slope, the curved tooth edges, as herein disclosed, and having the desired components may be established by striking arcs from positions external to the periphery of the fastener. As depicted in FIG. 5, a line 62 extends in a direction radial to the fastener axis, which line 62 is extended across the circle 60 which defines the major periphery dimension of the fastener. From a point at or radially outward from the point of intersection of the line 62 with the circle 60, a line 63 is erected which is perpendicular to the line 62 and which extends from the line 62 in a direction toward which the concave surfaces of the tooth arcs are to face. In the disclosed construction, the line 63 is drawn from the point at which the line 62 intersects the circle 60, although it is understood that the point of intersection of the lines 62 and 63 could be beyond or radially outward from the circle 60, in order to increase the ejecting component of the tooth curvature adjacent the outer surface of the fastener. Point 64 is then located along the line 63 from which an arc can be drawn which intersects the radial line 62 at the point of its intersection with the line 63 and which also crosses the threads 23a internally of the inner edge of the bearing surface 33. As herein depicted, an arc 65 intersects the radial line 62 at the circle 60 and is tangent to the minor diameter of the threads 23a. This establishes the arcuate curvature of each tooth and the disposition of the tooth across the bearing surface of the fastener. Also, the point 64 establishes the radius of a circle 66 drawn from the fastener axis and which serves as an orbit for the centers of the arcs of the tooth edges, which centers are equally spaced around the circle 66 to provide the desired number of teeth.

It may be understood that for production purposes, the establishment of the diameter of the circle 65 which determines the tooth arc also establishes the diameter of the milling cutter used for cutting the teeth in the die which is later used for stamping the teeth on the bearing surfaces of the fasteners. The axis of the cutter, during the cutting operation, is, of course, not parallel to the axis of the fastener, but is set at an angle to provide the desired edge and surface angles and to afford substantially uniform depth for each tooth edge across the bearing surface, with the teeth, if they vary in depth, tending to be deeper at the outer edge of the fastener. The die, of course, is indexed about its axis to obtain the desired number of teeth, and each tooth is desirably cut to the same depth.

The manner of locating the angles and positions of the teeth for the various types of fasteners, as illustrated in the various views of this application, is generally the same as that discussed, except that for the flange type fateners illustrated in FIGS. 1 to 4 inclusive, 7 and 8 and for the circular fasteners of the type shown in FIGS. 11 and 12, the perpendicular to a radial line which is used in the construction for locating the radius of the orbit circle 66 must be at or radially outward from the outer diameter of the flange surface upon which the bearing surface is located. Also, it is usually considered desirable to have the line 63 outward from the periphery of the flange, as shown in FIG. 1. It is further considered desirable to have the circle of tooth curvature cross the base of the fastener at a position outward from the minor thread diameter so that the chip ejecting component is increased for the longer teeth provided by the flanged structure of FIG. 1.

When the length of the teeth is limited by the provision of the circular recessed area 32 adjacent the threads of the fastener, as shown in FIG. 3, the point of intersection of the perpendicular line 63 with the radial line 62 is also desirably at a position radially outward from the periphery of the flange and the point of tangency of the cutter circle 65 should be located inwardly of a circle 67 which has a diameter equal to the distance between the flat side surfaces 27 across the fastener.

In respect to the illustrated constructions, it may be understood that as the diameter of the circle 66, which establishes the orbit of the centers for the tooth arcs, is increased, the established tooth arc approaches a straight line, but the positions of the intersection of the arc with the radial line and with the inner portion or threads of the fastener need not change from those utilized for the teeth having smaller radii.

The number and spacing of the teeth is determined by dividing the orbit circle 66 into equal segments and by drawing tooth arcs of the same radius from each such segment. It has been found that the number of teeth affording the most desirable characteristics in both bolt tension and release torque for a given application torque varies somewhat with the sizes of the fasteners. For most of the generally used sizes of fasteners, as for example, No. 6 through ⅜″ finished, the desirable number of teeth has been found to be between eighteen and sixty-six. The number of teeth generally increases with the size of the fastener. It has also been found that decreasing the number of teeth will increase bolt tension for a given wrench torque, and may decrease the release torque in relation to the application torque. As an example, fifty-four teeth has been found to be a desirable number for a ⁵⁄₁₆″ finished hexagonal nut, with the locations and slopes of the teeth determined as described in connection with FIG. 5. Teeth having a depth, as designated by the dimension $y$ in FIG. 14, of between .003″ and .015″ have been found to be most satisfactory for fasteners within the commonly used size ranges. The width $w$ tends to be approximately the same for the various sizes of nuts within a given dimensional series. Also, generally less teeth are required on flange type fasteners and circular fasteners, such as those shown in FIGS. 1 to 4 inclusive, 7, 8, 11 and 12 than on the fasteners of polygonal section, as shown in FIGS. 5, 6, 9 and 10.

As shown in the accompanying drawings, it has also been found that for fasteners of the type herein illustrated which have toothed bearing surfaces, it is desirable to have those bearing surfaces frusto-conical in form, rather than flat. The angle between this bearing surface and a plane perpendicular to the axis of the fastener, as indicated at $v$ in FIGS. 2, 4, 6, 8 and 10 should be between one-half of 1° and 12° for effecting desirable results. With this type of bearing surface, the fastener bears from the center outwardly as it is tightened. Thus, resistance to the tightening movement starts near the center and moves outwardly as the toothed locking surface cuts or embeds itself into the surface against which it has pressure engagement. It follows that the lever arm for the force resisting the tightening movement moves from the center to the outside of the fastener as it is tightened. With flat surfaces, it is found that there is often a tendency for the teeth to dig into the engaged surface near the corners of the fastener to an extent which sometimes prevents the central area of the bearing surface of the fastener from correctly and fully engaging the surface against which it has pressure contact. This is detrimental to both bolt tension and the application torque. Having full and desirable bearing contact between the teeth and the surface with which they have pressure engagement is also important to effecting a high value of release torque, since metal from the inner and central bearing areas is forced into the curved tooth edge surfaces and toward the periphery of the fastener along the tooth edges from the inner to the outer ends thereof to lock the fastener against removal.

From the foregoing description and the references to the accompanying drawings, it may be understood that we have developed a unitary fastener structure having integral teeth on a bearing surface thereof, which fastener structure is adapted to production at low cost on machines of the type generally used for making such fasteners, and which teeth effect the establishment of high values of bolt tension and release torque in comparison to the torque utilized for the application and tightening of the fastener. It is significant that the teeth may be utilized on either one or both ends of a double ended fastener and that the fasteners may be either plated or unplated, as desired.

Having thus described our invention, what we claim as new and desire to secure by Letters Patent of the United States is:

1. In a threaded fastener, the combination comprising a flat sided body of a regular polygonal section in a direction normal to a central axis and having opposed end surfaces, one of said end surfaces having the general form of a conical frustum and having teeth integrally formed thereon, said teeth extending across said one of the end surfaces in directions to form acute angles with radii intersecting the teeth at the outer ends thereof and being of substantially uniform depth and contour, each of said teeth having a surface and an edge intersecting in approximately right angular relationship, and said surfaces of the teeth presenting relatively gradual slopes facing in the direction of rotation for tightening the fastener, whereby the slopes of said edges facing in the opposite direction present abrupt slopes in the latter direction, said edges of the teeth being concavely curved in the direction toward which the fastener is turned for effecting the loosening thereof and being disposed with all increments of the concave surfaces facing outwardly from the axis of the fastener, and said edges of the teeth having the curvature of the arcs of circles having centers located ahead of said edges in the direction of turning of the fastener for loosening and in a circular orbit concentric to said central axis and haing a diameter greater than the outside dimension of said body in a direction lateral to the axis, and said circles having radii of a length to cross said conical frustum and the threads of the fastener and being tangent to a circle which is concentric to said central axis and which lies entirely within the flat side of the polygonal body.

2. In a threaded fastener having a central axis, the combination comprising a generally flat sided body, threads concentric with said central axis, said body having flat surfaces on opposite sides thereof for receiving a torque applying tool, said body also having end surfaces, one of said end surfaces having integral teeth of substantially uniform size and shape thereon which project axially of the end surface and which each have a relatively sharp corner at the juncture of a surface and an edge, the surfaces and edges of the teeth being in approximately right angular relationship to one another, and said edges being approximately uniform in depth throughout their length and extending to the periphery of the body in uniform directions non-radial with respect to said central axis and such that the outer end of each edge thereof is peripherally behind the rest of the edge when the fastener is turned in a direction for loosening the fastener, said edges of the teeth also being curved so as to be concave toward the direction of turning for loosening the fastener and said edges of the teeth having the curvature of the arcs of circles having centers located ahead of said edges in the direction of turning of the fastener for loosening and having centers on a circular orbit having a diameter larger than the outside dimension of the body in a direction normal to said axis, and said edges being arcs of circles which are tangent to a circle concentric with said central axis which lies entirely within the flat surface of said body.

3. The fastener of claim 2 in which said teeth have narrow edges and wide angularly disposed surfaces which expand in width toward the periphery of said body.

References Cited in the file of this patent

UNITED STATES PATENTS

| | | |
|---|---|---|
| 1,833,462 | Hagist | Nov. 24, 1931 |
| 2,201,087 | Hallowell | May 14, 1940 |
| 2,253,241 | MacDonald | Aug. 19, 1941 |

FOREIGN PATENTS

| | | |
|---|---|---|
| 39,290 | France | Oct. 12, 1931 |
| 993,510 | France | July 25, 1951 |